UNITED STATES PATENT OFFICE.

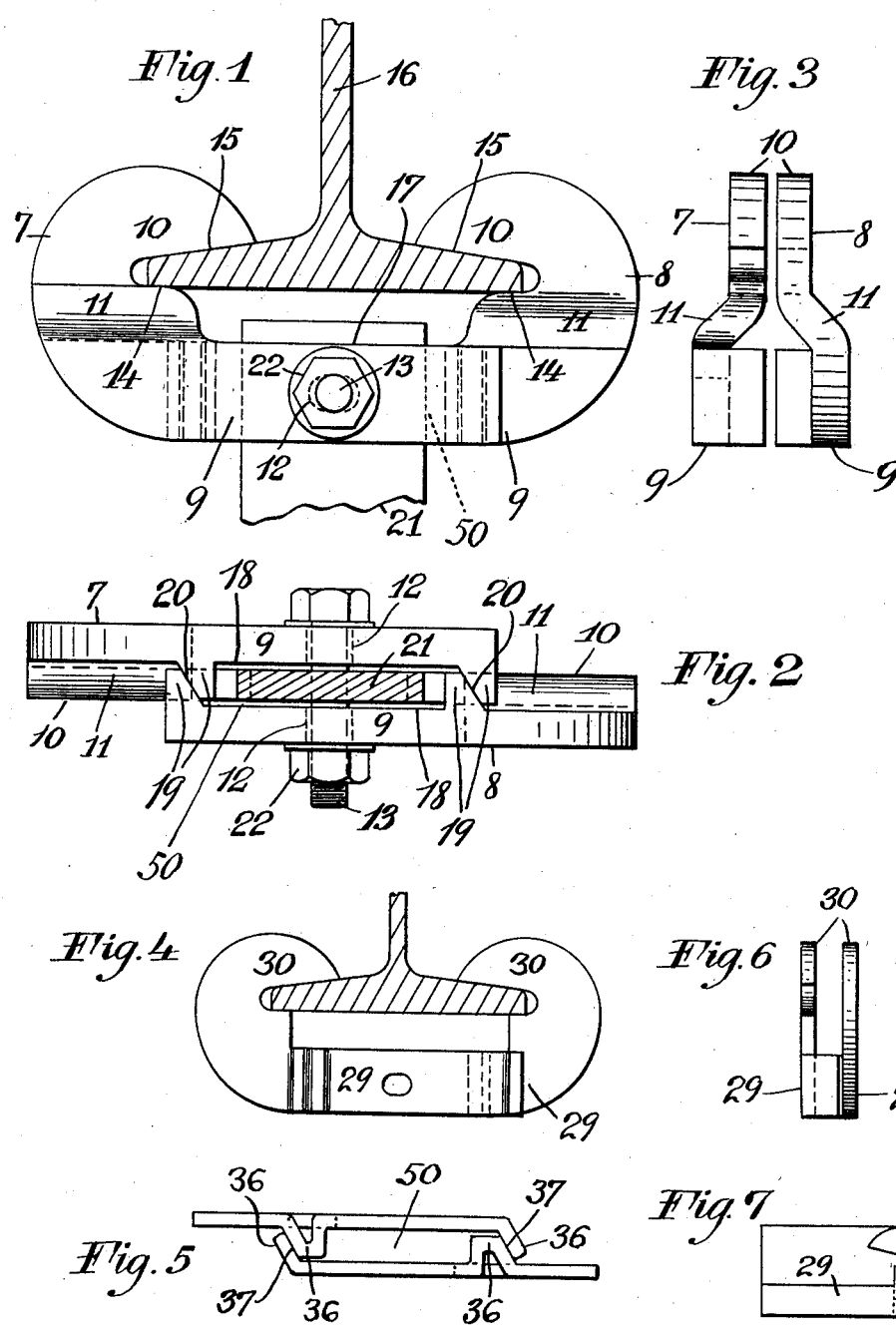

EUGENE L. SCHWARTZ, OF NEW YORK, N. Y.

CLAMP.

1,099,863.　　Specification of Letters Patent.　　Patented June 9, 1914.

Application filed November 14, 1913. Serial No. 801,067.

*To all whom it may concern:*

Be it known that I, EUGENE L. SCHWARTZ, a citizen of the Republic of Switzerland, and a resident of the city, county, and State of New York, have invented certain new and useful Improvements in Clamps, of which the following is a specification.

This invention relates to improvements in clamps of the type used for pipe hangers and the like.

The object of the invention is to provide a clamp adapted to be manufactured at a low cost and one which can be easily and quickly put up. While the prior art contains many clamps ostensibly designed for use with pipe hangers, they have not gone into general use so far as I am aware, because they are complicated and cost too much to manufacture. Therefore, in a great many cases the clamps are made on the job, that is a suitable length of flat iron is cut off, bent into the desired shape to fit over the I-beam and bored for the bolt. This makes the clamps quite expensive besides causing delay.

My invention is embodied in a clamp of a design adapted to be carried out in cast iron, and is so constructed that only one pattern is necessary.

Another feature of my invention is that the two parts of the clamp are each provided with cam surfaces or slanting projections whereby when the bolt is tightened the clamp halves are drawn together longitudinally.

Other objects of the invention and the features thereof will appear as this specification proceeds while reference is had to the accompanying drawings in which—

Figure 1 is a side view of a clamp embodying my invention and showing it in position on the I-beam. Fig. 2 is a bottom view of the clamp. Fig. 3 is an end view showing the two halves of the clamp separated. Figs. 4, 5 and 6 are corresponding views of a modified form of the clamp and Fig. 7 shows the blank from which the clamp in Fig. 4 is bent.

Referring to the first three figures the clamp consists of two halves 7 and 8, each of which comprises a body portion 9 and a hook portion 10. The latter is off-set with respect to the body at 11 and whereby the two hook portions come opposite each other as seen in Fig. 2. The body portion of each clamp is provided with an elongated hole 12 for the passage of the bolt 13. The hook portion has the clamping faces 14 and 15 which are adapted to fit over the flanges of the I beam 16. The lower clamping face 14 is purposely raised a distance above the upper surface 17 of the body portion to provide a space beneath the I-beam as shown, and whereby it is possible to pass the end of a supporting member between the I-beam and the clamp which is desirable when head room is limited. The inside faces 18 of the body portions are provided with cams 19 having the slanting surfaces 20 which slant in a direction away from the hook portion. In operation each half of the clamp is hooked over the I-beam flange, the holes 12 are brought into register with the hole in the hanger 21, the bolt 13 is passed through the holes and the nut 22 screwed on the bolt to draw the two halves together. It will be noted, however, that the mere tightening of the nut will not cause the hook portions to engage the I-beam flanges firmly. But as the nut is tightened, the engagement of the cam surfaces 20 with each other will cause the two halves of the clamp to slide longitudinally of each other to draw the hook portions firmly over the I-beam flanges, it being understood, that the clamps are so designed and the cams are so spaced that the hook portions have fully engaged the I-beam flanges before the cams touch the opposed inner face 18 of the clamp. Another feature of my invention resides in the fact that because of the projecting cams 19 a space 50 is formed between the two clamp halves or inside the clamp as it were and in which the hanger 21 is hung on the bolt 13. This is of particular advantage in that thereby the weight of the hanger and the articles supported by it is distributed evenly on the two clamp halves while when the hanger is hung outside the clamp it causes an uneven strain on the clamp and the bolt.

Figs. 4 to 7 illustrate a clamp adapted to be stamped out from a blank and bent into the desired shape. The blank is illustrated in Fig. 7 and the cut out clamp comprises a body portion 29 and a hook portion 30. After the blank has been cut the cam surfaces 37 are formed by bending to form the projections 36 as shown in Fig. 5. Preferably the shape of the blank is such that the bend nearest the hook portion 30 occurs at 40 in Fig. 7, that is all the bends occur in the body portion proper.

It will be seen that I have provided a clamp composed of two symmetrical halves provided with cams the surfaces of which engage each other to draw the two halves together longitudinally when the clamp is put up and the nut tightened to cause a firm engagement of the hooks with the flanges of the I beam. The details of construction may be varied within the scope of the appended claims.

I claim:—

1. A clamp consisting of two opposed symmetrical halves, each comprising a body portion and a hook portion adapted to engage the flanges of an I-beam or similar member, a bolt and nut for securing the said two clamp halves together, the said body portions being provided with elongated apertures to permit the passage of the said bolt, cams formed on the inside faces of the body portions and provided with slanting cam surfaces, the cam surfaces on the opposed clamp halves being adapted to engage each other to automatically draw the two halves together longitudinally when the nut is tightened on the bolt.

2. A clamp consisting of two opposed symmetrical halves, stamped from a flat piece and each half comprising a body portion and a hook portion adapted to engage the flanges of an I-beam, a bolt and nut for securing the said two clamp halves together, the said body portions being provided with elongated apertures to permit the passage of the said bolt, said body portions being bent inwardly to form cams provided with slanting surfaces, the cam surfaces on the opposed clamp halves being adapted to engage each other to automatically draw the two halves together longitudinally when the nut is tightened on the bolt.

3. The combination with an I-beam or similar support and a hanger, of a clamp consisting of two symmetrical halves, each comprising a body portion and a hook portion adapted to engage the flange of said I-beam, projections formed on the inside faces of the body portions to form a space between said clamp halves for the reception of the said hanger and a bolt and nut for securing the said two clamp halves together and for the support of the said hanger.

Signed at New York, N. Y., this 12th day of Nov. 1913.

EUGENE L. SCHWARTZ.

Witnesses:
 IVAN KONIGSBERG,
 K. G. LE ARD.

---

Copies of this patent may be obtained for five cents each, by addressing the "Commissioner of Patents, Washington, D. C."